(12) United States Patent
Tsien et al.

(10) Patent No.: US 12,271,244 B2
(45) Date of Patent: Apr. 8, 2025

(54) ON-DEMAND IP INITIALIZATION WITHIN POWER STATES

(71) Applicant: Advanced Micro Devices, Inc., Santa Clara, CA (US)

(72) Inventors: Benjamin Tsien, Santa Clara, CA (US); Indrani Paul, Austin, TX (US); Alexander J. Branover, Boxborough, MA (US); Thomas J. Gibney, Boxborough, MA (US); Mihir Shaileshbhai Doctor, Santa Clara, CA (US); John P. Petry, Santa Clara, CA (US); Stephen V. Kosonocky, Fort Collins, CO (US); Christopher T. Weaver, Boxborough, MA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 201 days.

(21) Appl. No.: 17/390,429

(22) Filed: Jul. 30, 2021

(65) Prior Publication Data
US 2023/0031388 A1 Feb. 2, 2023

(51) Int. Cl.
G06F 9/24 (2006.01)
G06F 1/3203 (2019.01)
G06F 9/4401 (2018.01)

(52) U.S. Cl.
CPC .......... *G06F 1/3203* (2013.01); *G06F 9/4401* (2013.01)

(58) Field of Classification Search
CPC .................................................. G06F 1/3203
USPC ........................................................ 713/323
See application file for complete search history.

(56) References Cited

U.S. PATENT DOCUMENTS

| 8,654,694 | B2* | 2/2014 | Chang | H04W 52/0216 455/574 |
| 9,411,394 | B2* | 8/2016 | Younger | G06F 1/3287 |
| 10,162,917 | B1* | 12/2018 | Peixoto | G06F 30/33 |
| 2005/0097378 | A1* | 5/2005 | Hwang | G06F 1/3209 713/320 |
| 2005/0138441 | A1* | 6/2005 | Huffman | G06F 1/3268 713/300 |

(Continued)

OTHER PUBLICATIONS

Jefi Forum, Inc., "Advanced Configuration and Power Interface (ACPI) Specification", Version 6.3, Jan. 2019, 1,239 pgs.

(Continued)

*Primary Examiner* — Volvick Derose
(74) *Attorney, Agent, or Firm* — Volpe Koenig

(57) ABSTRACT

Systems, methods, and devices for integrated circuit power management. A mode of a power management state is entered, from the power management state, in response to an entry condition of the mode. A device that is otherwise powered off in the power management state is powered on in the mode of the power management state. In some implementations, the device includes a communications path between a second device and a third device. In some implementations, the device is in a power domain that is powered off in the power management state. In some implementations, the power domain is powered off in the mode. In some implementations, the device is powered on in the mode via a power rail that is specific to the mode. In some implementations, the entry condition of the mode includes an amount of data stored for display in a display buffer falling below a threshold amount.

16 Claims, 8 Drawing Sheets

(56) References Cited

U.S. PATENT DOCUMENTS

| | | | | |
|---|---|---|---|---|
| 2005/0262368 A1* | 11/2005 | Cherukuri | G06F 1/3253 | 713/324 |
| 2008/0178031 A1* | 7/2008 | Kim | G06F 1/3203 | 713/330 |
| 2009/0315399 A1* | 12/2009 | Shikata | G06F 1/3287 | 307/38 |
| 2010/0064160 A1* | 3/2010 | Wilson | G06F 1/3206 | 713/320 |
| 2011/0179299 A1* | 7/2011 | Piwonka | G06F 1/3287 | 713/323 |
| 2012/0102344 A1* | 4/2012 | Kocev | G06F 1/3287 | 713/322 |
| 2013/0042126 A1* | 2/2013 | Ganesan | G06F 1/3275 | 713/324 |
| 2014/0095910 A1* | 4/2014 | Conrad | G06F 13/00 | 713/323 |
| 2014/0167840 A1* | 6/2014 | Machnicki | G06F 1/3237 | 327/544 |
| 2015/0095681 A1* | 4/2015 | Jouin | G06F 1/3228 | 713/323 |
| 2016/0091954 A1* | 3/2016 | de la Cropte de Chanterac | G06F 1/3206 | 713/320 |
| 2016/0162016 A1* | 6/2016 | Lee | G06F 1/3296 | 713/323 |
| 2016/0170776 A1* | 6/2016 | Bergström | G06F 9/44505 | 713/100 |
| 2016/0209907 A1* | 7/2016 | Han | G06F 1/3243 | |
| 2017/0235352 A1* | 8/2017 | Kumar | H03K 19/1776 | 713/330 |
| 2017/0351450 A1* | 12/2017 | Brandl | G06F 3/0673 | |
| 2018/0242245 A1* | 8/2018 | Dede | H04W 76/28 | |
| 2019/0146573 A1* | 5/2019 | Zeng | G06F 11/3024 | 713/323 |
| 2019/0147926 A1* | 5/2019 | Branover | G06F 1/325 | 327/158 |
| 2019/0163255 A1* | 5/2019 | Dewey | G06F 1/3287 | |
| 2019/0377404 A1* | 12/2019 | Zwerg | G06F 1/3206 | |
| 2021/0405732 A1* | 12/2021 | Amireddy | G06F 1/3296 | |
| 2022/0029624 A1* | 1/2022 | Sung | H03K 19/003 | |

OTHER PUBLICATIONS

Jefi Forum, Inc., "Advanced Configuration and Power Interface (ACPI) Specification", Version 6.4, Jan. 2021, 1,087 pgs.

\* cited by examiner

ON-DEMAND IP INITIALIZATION WITHIN POWER STATES

BACKGROUND

Computing systems integrate large numbers of different types of components on a single chip or on multi-chip modules. The complexity and power consumption of a system increases with the number of different types of components. Power management is an important aspect of the design and operation of integrated circuits, especially circuits that are integrated within devices that typically rely on battery power, such as mobile devices. Reducing power consumption in the integrated circuits of these devices can increase the life of the battery as well as reduce the amount of heat generated by the integrated circuits.

BRIEF DESCRIPTION OF THE DRAWINGS

A more detailed understanding can be had from the following description, given by way of example in conjunction with the accompanying drawings wherein.

DETAILED DESCRIPTION

Figure 1:
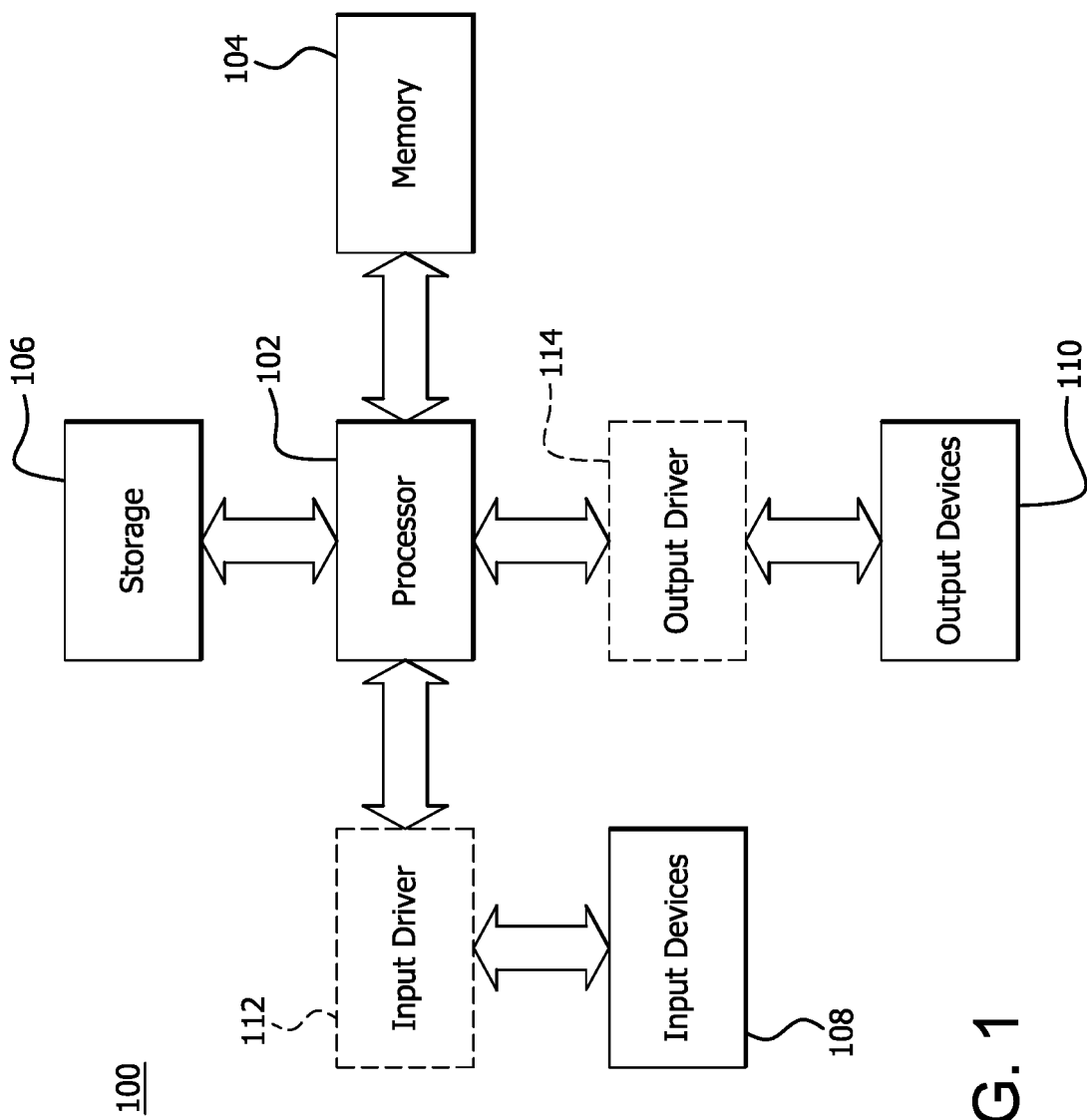
FIG. 1 is a block diagram of an example device in which one or more features of the disclosure can be implemented.

Some conventional devices reduce power consumption by entering a reduced power state. A reduced power state (which can be referred to as a power management state, or a power-gated state) is a state in which a device or one or more components of the device are operating in a mode which consumes less power than another operating mode. For example, the power that would ordinarily be used to retain a present power state is removed from one or more components to enter the power-gating state and consume less power. A reduced power state is entered, for example, by turning off or removing power to a component, or alternatively, reducing a power supply voltage and/or reducing a clock frequency supplied to a component.

Prior to entering a reduced power state, a configuration register state is saved to memory (e.g., dynamic random-access memory (DRAM)). A configuration register state refers to the values stored in a plurality of configuration registers, assigned to a component of a device, which identify the component, define various features of the component, and allow system software to interface with and/or control the operation of the component. The registers assigned to a component include any number and type of registers, such as routing tables, address maps, configuration data, buffer allocation information, including flow control credits (e.g., when a first component communicates its buffer counts to a second component during initialization, such that the second component has an indication of a number of packets that can be sent to the first component without pausing and waiting for the buffers to be freed up), performance registers and debug related registers.

The operating system, device drivers, and diagnostic software typically access the configuration register state during operation of a component. Upon exiting the reduced power state, the configuration register state is restored. Saving and restoring the configuration register state of the component ensures that the component operates the same way before power is removed and after power is restored and prevents the occurrence of computing errors resulting from incorrect data being stored during execution. Saving the configuration register state to memory each time the system enters the reduced power state, however, causes a delay which reduces the total amount of time spent in the reduced power state. Also, writing the configuration register state to memory incurs a power use penalty. Further, restoring the configuration register state from memory each time the system exits the reduced power state also causes a delay which reduces the total amount of time spent in the low power state and contributes to the exit latency of the reduced power state.

In shallower reduced power states, (e.g., Z0-Z8 power states), power is supplied to one or more components. For example, during an example Z8 power state, power (e.g., voltage) is supplied to some components, but at a reduced voltage. During transitioning to and from the shallower reduced power states, the configuration register states of each component is saved and restored.

In deeper reduced power states (e.g., Z9 and Z10 power states), however, power is not supplied to one or more of the components. For example, during the Z9 power state, power is supplied to the display (e.g., the display controller), but is not supplied to other components (e.g., CPU, GPU, memory controller, and data fabric or other interconnection medium). During the Z10 power state, power is not supplied to the display controller or the previously mentioned components of the device. When power is not supplied to these components, they are unable to function and communicate data between one another.

During operation of the device, it may arise that components become idle for short intervals of time. For example, when a user is viewing a display, but the device is not receiving any user input for short periods of time (e.g., time periods between keystrokes), in some cases, components (e.g., CPU, GPU, memory controller, data fabric) become idle during these short periods of time. During these short periods of idle time, in some implementations, power consumption of the device is reduced by transitioning to the Z9 power state and removing power supplied to these components.

Conventional systems detect the idleness (i.e., idle or not idle) of a component via software, and are not able to restore power and exit a reduced power state until after until an amount of time (e.g., multiple milliseconds (ms)) has passed since the component became active (i.e., no longer idle). This amount of time can be referred to as an exit latency of the reduced power state. Accordingly, conventional systems are not able to efficiently transition between reduced power states for these short periods of idle time (e.g., time periods between keystrokes), e.g., due to the exit latency of the reduced power states.

Accordingly, some implementations provide efficient transitioning between different reduced power states, e.g., via aspects of a power management controller (PMC), which identifies (e.g., via a wake signal) the idleness of one or more components and implements a handshaking process (e.g., fence requests and fence acknowledgement) with the components to efficiently transition between power states. Some implementations provide for on-demand powering of specific circuitry (e.g., certain IP blocks, such as all or part of a data fabric) without exiting the low power state or incurring the exit latency (or full exit latency).

Some implementations (e.g., the Z9 power state) include a stutter mode (e.g., a display stutter mode) to provide on-demand powering of specific circuitry without exiting the low-power state. For example, in some implementations, the display controller is powered on in a Z9 (or other) power state, while the CPU, GPU, and data fabric are powered off (or reduced in power in some implementations). Because the display is on in the Z9 power state, the display controller continuously outputs data to a display from its data buffers. As the display controller outputs the data for display, its data buffers drain to provide the data to the display, but are not refilled, since the data fabric and/or memory controller is powered off in the Z9 power state. Accordingly, in some implementations, when the amount of data for display that is stored in the display buffer empties to below a threshold amount of data for display, the data fabric (or a part thereof) and/or memory controller is powered on, and the display buffer is refilled, without exiting them Z9 reduced power state. In some implementations after the display buffer fills up, the device exits the stutter mode, and the data fabric and/or memory IO are once again powered down. It is noted that the stutter mode is implementable in other power states (e.g., other low power states) to provide on-demand powering of other specific circuitry without exiting the low-power state. In some implementations, filling the display buffer is both an exit condition for the stutter mode, and an entry condition for the Z9 power state.

Because display is a time-sensitive operation (e.g., having essentially a real-time QoS requirement in some cases), in some implementations it is better to allow the display controller to continue to access memory for as long as possible to complete its tasks before power is removed. Accordingly, the latency periods for entry to and exit from the Z9 power state have stricter tolerances than the latency periods for the Z10 power state, e.g., in order to efficiently implement the display stutter mode. Because the Z10 power state is enabled when a display is powered off or in panel self-refresh (PSR), a longer exit latency is tolerated in exchange for lower power in the Z10 power state.

Some implementations provide a method for integrated circuit power management. A mode of a power management state is entered, from the power management state, in response to an entry condition of the mode. A device that is otherwise powered off in the power management state is powered on in the mode of the power management state.

In some implementations, the device includes a communications path between a second device and a third device. In some implementations, the device is in a power domain that is powered off in the power management state. In some implementations, the power domain is powered off in the mode. In some implementations, the device is powered on in the mode via a power rail that is specific to the mode. In some implementations, the entry condition of the mode includes an amount of data stored for display in a display buffer falling below a threshold amount. In some implementations, the device includes a communications path between a display buffer and a memory. In some implementations, the device includes at least a portion of a data fabric. In some implementations, an exit condition of the mode includes a display buffer being full. In some implementations, the in the mode, the device communicates with a second device that is in a power domain that is on in the power management state.

Some implementations provide a processor that is configured for power management. The processor includes circuitry configured to enter a mode of a power management state, from the power management state, in response to an entry condition of the mode. The processor also includes circuitry configured to power on a device that is otherwise powered off in the power management state, in the mode of the power management state.

In some implementations, the device includes a communications path between a second device and a third device. In some implementations, the device is in a power domain that is powered off in the power management state. In some implementations, the power domain is powered off in the mode. In some implementations, the device is powered on in the mode via a power rail that is specific to the mode. In some implementations, the entry condition of the mode includes an amount of data stored for display in a display buffer falling below a threshold amount. In some implementations, the device includes a communications path between a display buffer and a memory. In some implementations, the device includes at least a portion of a data fabric. In some implementations, an exit condition of the mode includes a display buffer being full. In some implementations, the device is configured to communicate with a second device that is in a power domain that is on in the power management state, in the mode.

FIG. 1 is a block diagram of an example device 100 in which one or more features of the disclosure can be implemented. The device 100 can include, for example, a computer, a gaming device, a handheld device, a set-top box, a television, a mobile phone, server, a tablet computer or other types of computing devices. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid-state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
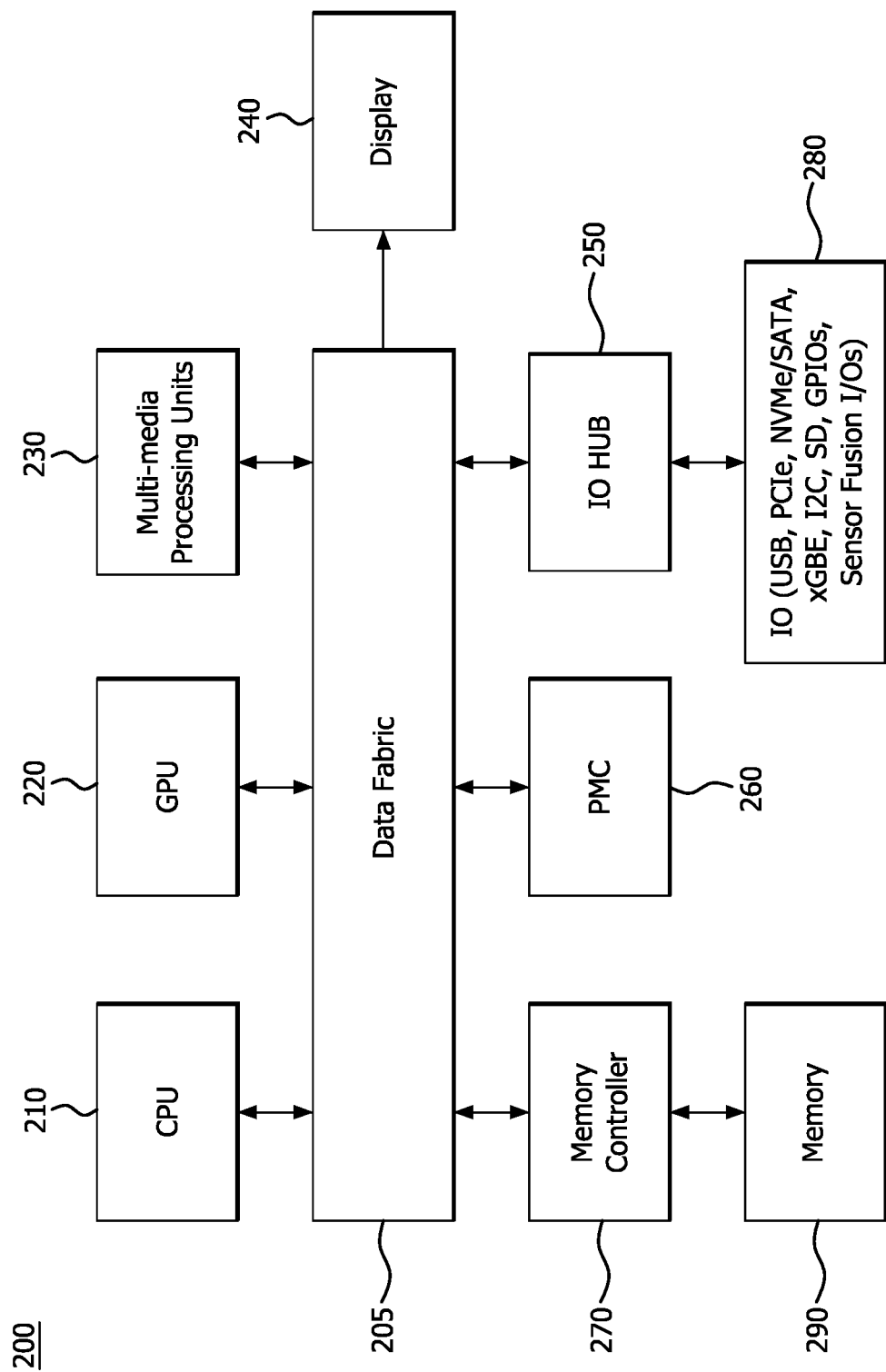
FIG. 2 is a block diagram of another example device in which one or more features of the disclosure can be implemented.

FIG. 2 is a block diagram illustrating example components of an example device 200, including PMC 260, for implementing one or more features of the disclosure. The components of the example device 200 include data fabric 205, which is representative of any type of communication fabric, bus, and/or other control and interface logic for communicating data between intellectual property components (referred to herein as "IP") of a device. IP components include, for example, cores, hardware blocks, memory cells and logic used to execute various portions of a program or application. In some implementations, example device 200 is implemented using components shown and described with respect to FIG. 1.

Data fabric 205 includes data paths, switches, routers, and other logic used to communicate data among the various IPs, such as CPU 210, GPU 220, multi-media processing units 230, display 240 (via a display controller 245 shown in FIG. 3), I/O hub 250 and memory controller 270. Data fabric 205 can be bus-based, including shared bus configurations, crossbar configurations, and hierarchical buses with bridges. Fabric 205 can also be packet-based, and can be hierarchical with bridges, crossbar, point-to-point, or other interconnects. The arrows in FIG. 2 show example data flow between the IP components of the device.

The components of the device 200 shown in FIG. 2 also include various I/O components 280, such as for example, a universal serial bus (USB) port, a peripheral component interconnect express (PCIe) bus, a NVMe controller, a general-purpose input/output (GPIO) controller and sensor fusion I/O components.

As described in more detail below with regard to FIG. 3, PMC 260 includes a combination of hardware and firmware and interfaces with the IP components (e.g., CPU 210, GPU 220, multi-media processing units 230, display 240, I/O hub 250, and memory controller 270) via IP component control interfaces and register bus interfaces (not shown, different from the data fabric interfaces used to communicate data between IP components) to manage the transitions (e.g., entry and exit) between different powers states of a device.

Figure 3:
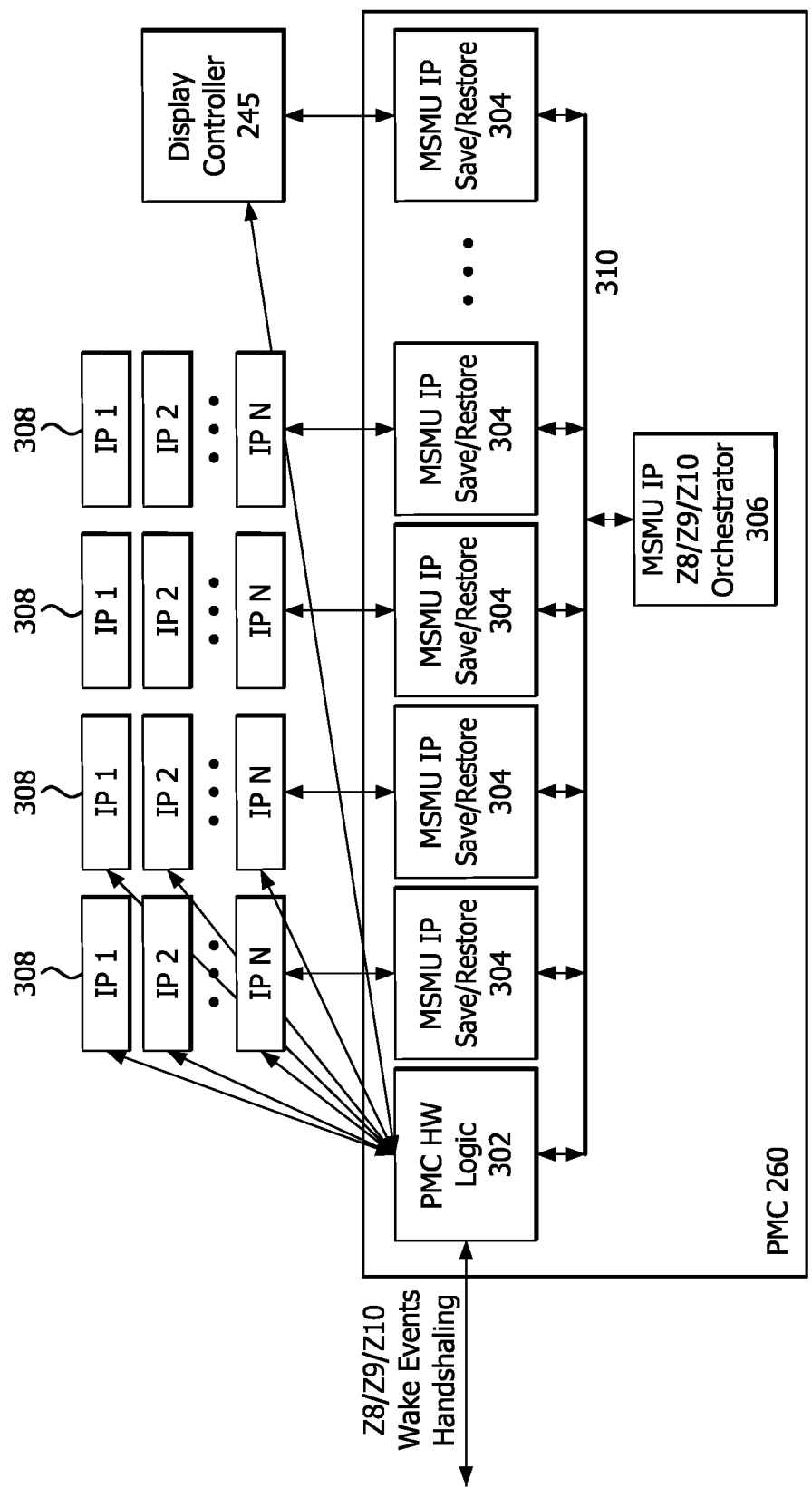
FIG. 3 is a block diagram illustrating an example power management controller of the example device shown and described with respect to FIG. 2.
Figure 5:
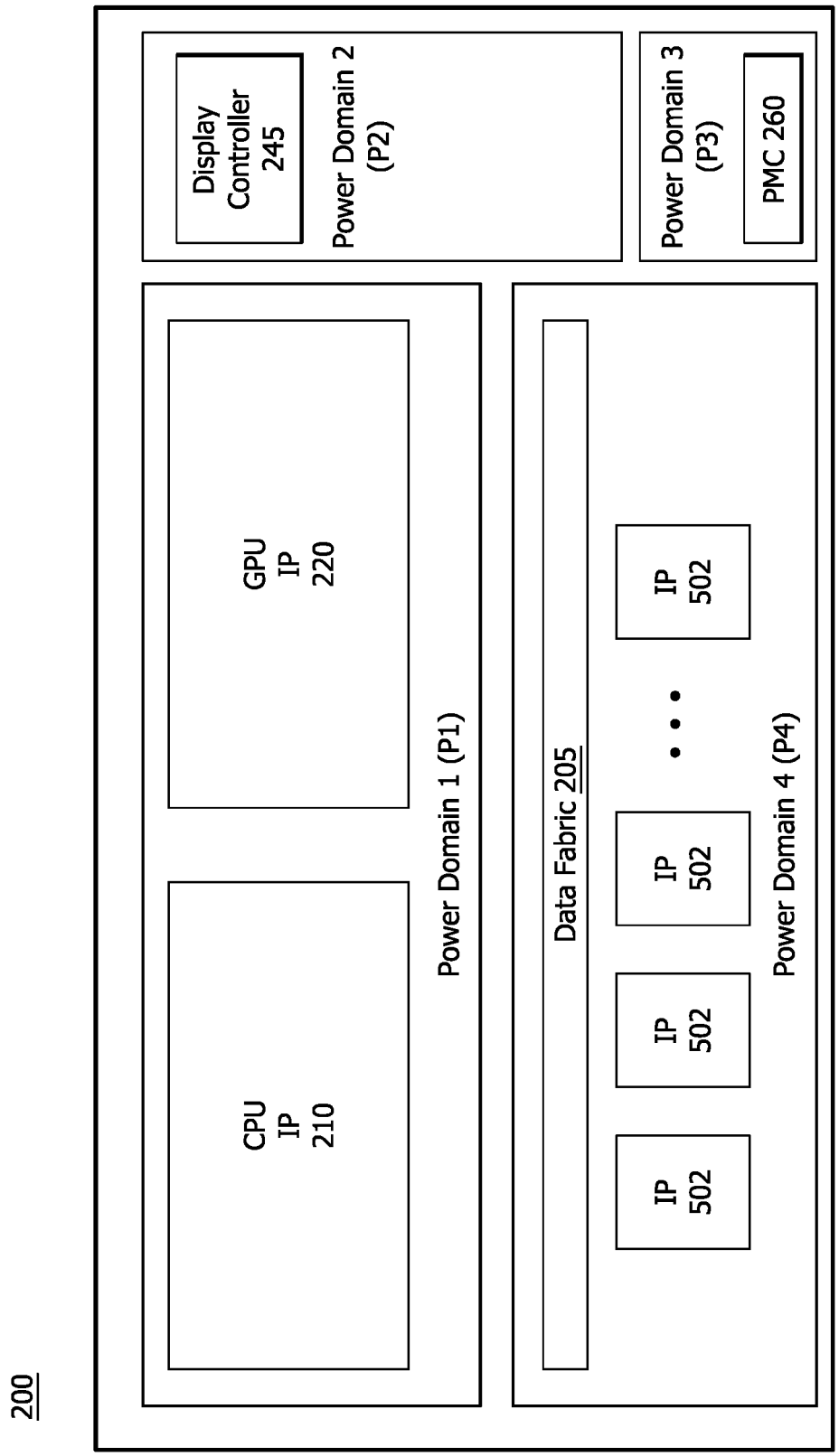
FIG. 5 is a block diagram illustrating example power domains of the example device shown and described with respect to FIG. 2.

FIG. 3 is a block diagram illustrating example components of PMC 260 in communication with a plurality of example IP components 308. As shown in FIG. 3, the PMC 260 includes PMC hardware (HW) logic 302, IP Save/Restore middle system management units (MSMUs) 304, and main MSMU 306. PMC HW logic 302 is a hardware block (logic circuitry) which interfaces with IP components 308 (in the P1 and P2 power domains as shown in FIG. 5), display controller 245 (in the P2 power domain as shown in FIG. 5), and any other power-controlled components not shown (e.g., data fabric 205, in the P4 power domain as shown in FIG. 5) according to an IP/PMC interface protocol. For example, the PMC HW logic 302 receives idleness indications of whether one or more of the IP components 308 are idle or are not idle (e.g., wake event) and performs handshaking (e.g., sends fence requests to one or more IP components 308 and receives fence acknowledgements from the one or more IP components 308).

Figure 4:
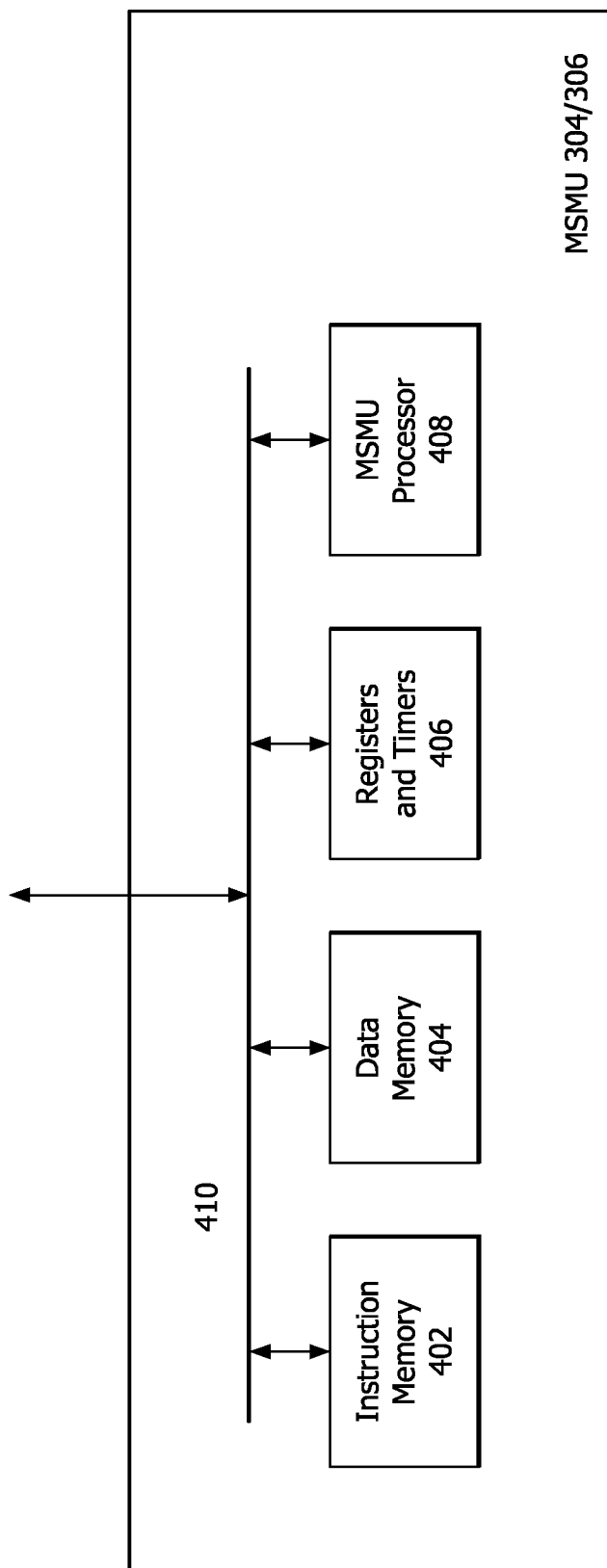
FIG. 4 is a block diagram illustrating example components of the power management controller shown and described with respect to FIG. 3.

FIG. 4 is a block diagram illustrating example components of the MSMUs 304 and 306 shown in FIG. 3. As shown in FIG. 4, each MSMU 304 and 306 includes instruction memory 402, data memory 404, registers and timers 406, instruction processor 408 and MSMU bus 410. The IP Save/Restore MSMUs 304 operate in parallel to save register data, of corresponding IP components 308, in their data memory 404 and restore the register data, to their corresponding IP components 308, from their data memory 404.

Each MSMU processor 408 executes firmware instructions in its instruction memory 402 to save and restore the register data for its corresponding IP components 308. The instruction memory 402 includes a limited set of firmware instructions (e.g., 16 instructions) which are used to efficiently implement the register save-restore traffic (e.g., meet target latency periods between a time in which one or more IP components 308 becomes active (i.e., not idle) and a time to restore one or more IP components 308 the device 200 to an active state.

The main MSMU 306 communicates with the IP Save/Restore MSMUs 304 and PMC HW logic 302 via PMC bus 310 and includes firmware instructions which are used to manage the IP Save/Restore MSMUs 304 and orchestrate the implementation of the register save-restore traffic between the IP Save/Restore MSMUs 304 and their corresponding IP components 308.

FIG. 5 is a block diagram illustrating example power domains of the example device 200. It is noted that different components are arranged in different power domains as desired in some implementations. As shown in the example of FIG. 5, the IP components in the first power domain (P1) include CPU 210 and GPU 220. The second power domain (P2) includes display controller 245. The third power domain (P3) includes PMC 260. The fourth power domain includes other components of device 200, such as data fabric 205, other IP components 502, such as for example multi-media processing units 230, I/O hub 250, and memory controller 270, and I/O components 280.

The power states of the device 200 include, for example, 11 states ranging from Z0 (also referred to as state S0) to Z10. Features of the present disclosure can be implemented, however, for any number of power states. During the S0/Z0 power state, power is provided to each of the domains (e.g., each power rail is ON). During the Z1-Z7 states, one or more, but not all of the IP components are idle. During the Z8 and Z9 power states, CPU 210, GPU 220 and IP components 502 are idle. During the Z8 state, power (e.g., voltage) supplied to the P1 power domain is reduced and CPU 210 is off. During the Z9 state, power is not supplied (i.e., power is OFF) to the P1 and P4 power domains. During the Z10 state, power is not supplied to the P1, P4, and P2 power domains. These power states and power state configurations are examples only, and other configurations of various power states are usable.

Figure 6:
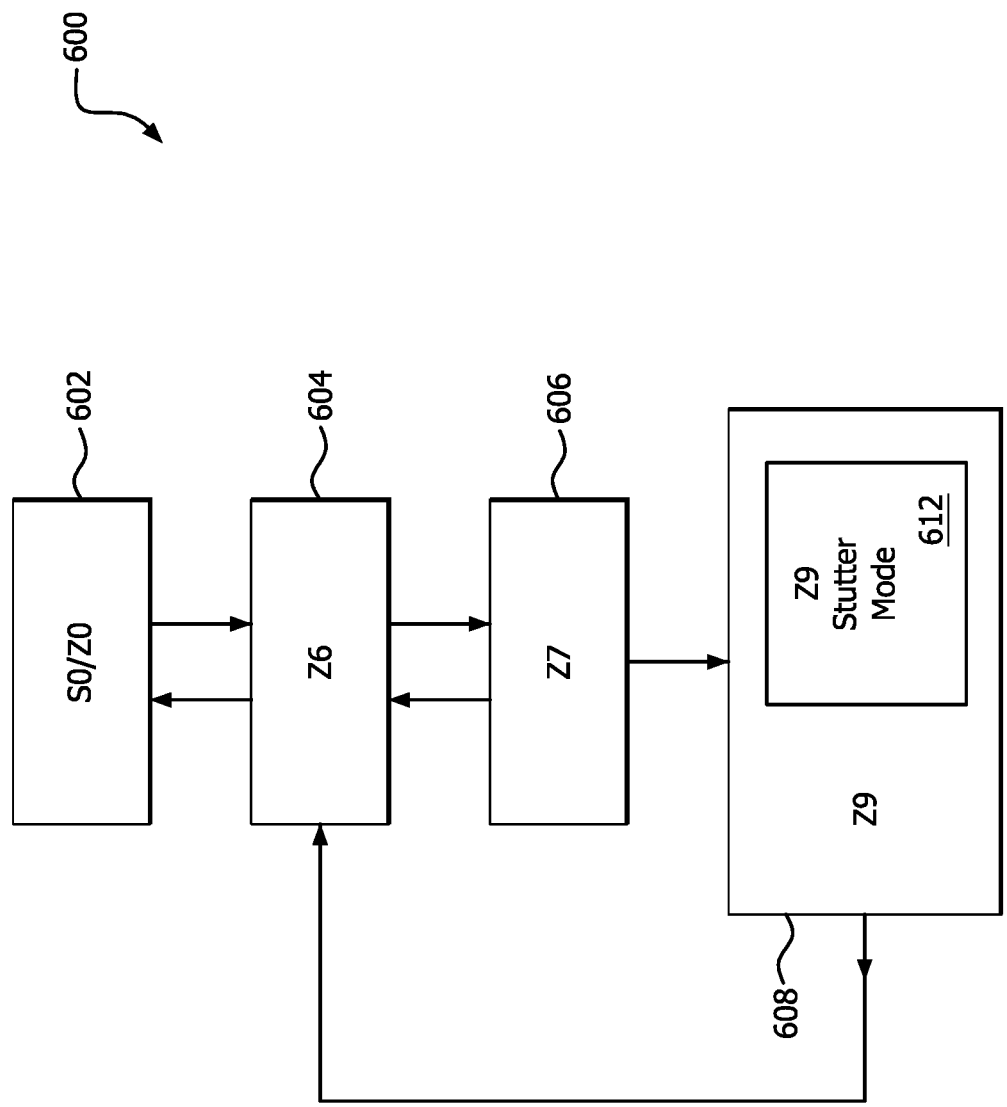
FIG. 6 is a flow chart illustrating example transitions among an example set of power states.

FIG. 6 is a flow chart illustrating example transitions 600 among an example set power states, which in this example are a subset of the power states described with respect to the power domains shown in FIG. 5.

S0 state 602 is a fully active state where all of the power domains P1-P5 are active and powered. Accordingly, power is supplied to CPU 210, GPU 220, data fabric 205, IP components 502, multi-media processing units 230, I/O hub 250, memory controller 270, display controller 245, PMC 260, and other components of device 200, such as I/O components 280.

If entry conditions for a low power state, such as Z6 state 604, are detected by PMC 260 (e.g., idle CPU above a threshold time, etc.), PMC 260 transitions the power state to Z6 state 604. In Z6 state 604, all of the power domains remain on, but CPU 210 is power gated or turned off.

From the Z6 state 604, if exit conditions for the Z6 state 604 are detected by PMC 260, PMC 260 transitions the power state to S0 state 602. On the other hand, if entry conditions for Z7 state 606 are detected by PMC 260, PMC 260 transitions the power state to Z7 state 606. In Z7 state 604, power domain P1 is power gated such that CPU IP 210 and CPU IP 220 do not receive power and are turned off.

From the Z7 state 606, if exit conditions for Z7 state 608 are detected by PMC 260, PMC 260 transitions the power state back to Z6 state 604. On the other hand, if entry conditions for Z9 state 608 are detected by PMC 260, PMC 260 transitions the power state to Z9 state 608. In the Z9 state, power domain P1, which includes CPU 210, GPU 220 remains completely powered off, and power domain P4, which includes data fabric 205 and IPs 502, is also completely powered off.

From the Z9 state 608, if exit conditions for Z9 state 608 are detected by PMC 260, PMC 260 transitions the power state to Z6 state 604, where the P1 power domain is on again. Example exit conditions for Z9 state 608 include a device interrupt, timer expiration, or device request for direct memory access (DMA). A wake signal is one example of a device interrupt. Expiration of a local advance programmable interrupt controller (LAPIC) timer is one example of a timer expiration. It is noted that this differs from exit conditions for the Z7 state 606 and Z6 state 604, where the exit conditions cause PMC 260 to transition to the preceding state. In contrast, the Z9 state 608 exits to the Z6 state 604, from which Z9 state 608 does not enter directly. Thus, in some implementations, exiting the Z9 state 608 would entail substantial exit latency due to powering on the entirety of power domain P1.

On the other hand, if exit conditions for Z9 state 608 are not detected by PMC 260, but stutter conditions are detected by PMC 260, PMC 260 transitions to a stutter mode 612 without exiting power state to Z9 state 608. For example, in Z9 state 608, the display controller continuously outputs data to a display from its data buffers. As the display controller outputs the data for display, its data buffers drain to provide the data to the display, but are not refilled, since the data fabric and/or memory controller is powered off in the Z9 state 608. In this example, the stutter condition occurs when the amount of data for display that is stored in the display buffer empties to below a threshold amount of data for display.

In this example, PMC 260 transitions to the stutter mode 612 based on the data stored in the display buffer emptying to below a threshold amount of data for display (e.g., indicated by an interrupt or other suitable signal). In the stutter mode, power domain P1 remains powered down. However, in stutter mode 612, the data fabric (or a part thereof) and/or memory controller is powered on, even though these devices are part of the P1 power domain. In some implementations, this is facilitated by a stutter-state specific power rail (e.g., a "stutter rail") which specifically provides power to these components. Accordingly, the display buffer is refilled without exiting the Z9 state 608.

In some implementations after the display buffer fills (e.g., completely, or above a threshold amount), the device exits stutter mode 612, and the data fabric and/or memory IO are once again powered down. It is noted that stutter mode 612 is implementable in other power states (e.g., other low power states) to provide on-demand powering of other specific circuitry without exiting the low-power state. In some implementations, filling the display buffer is both an exit condition for stutter mode 612, and an entry condition for the Z9 state 608.

Figure 7:
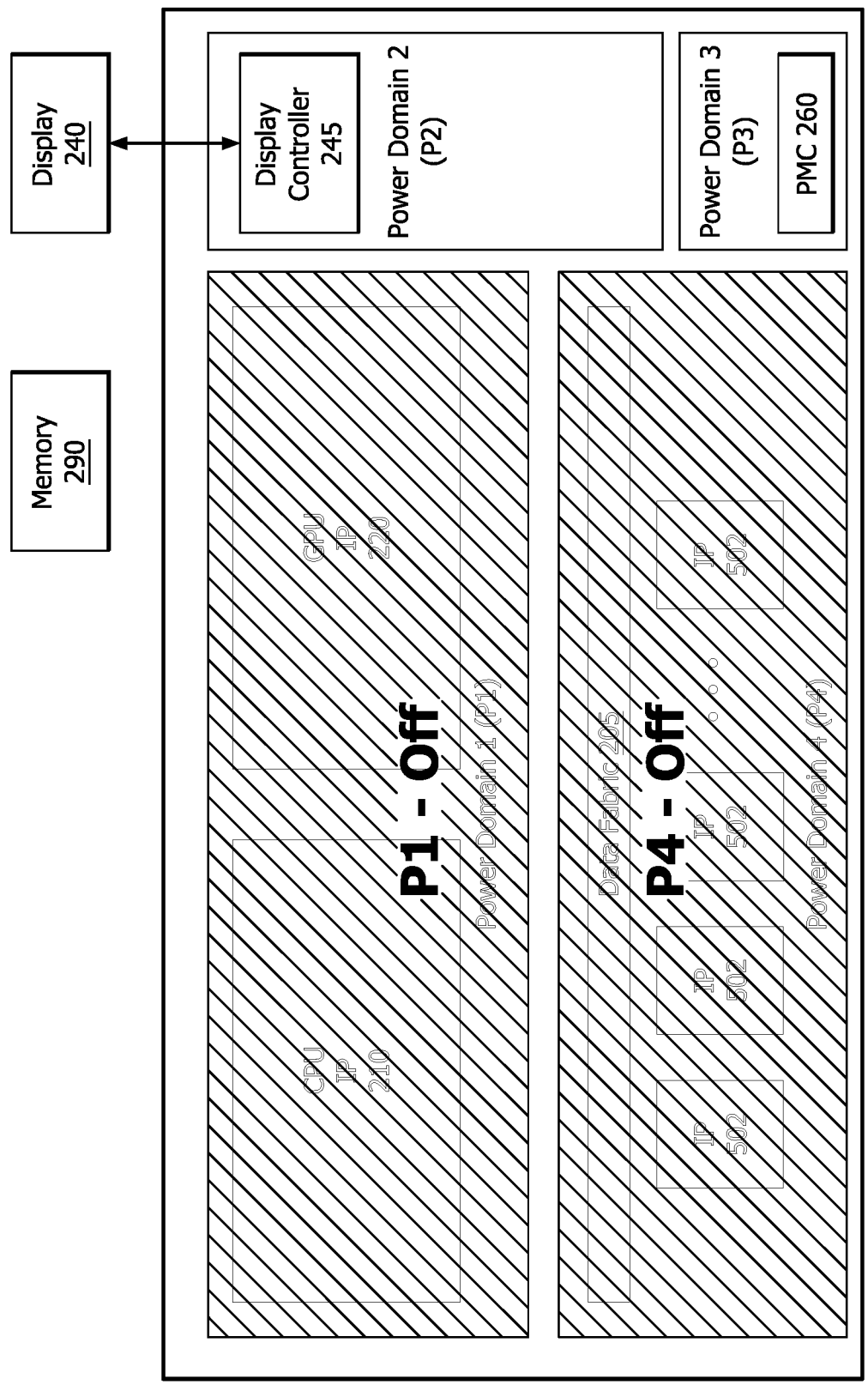
FIG. 7 is a block diagram illustrating the example power domains shown and described with respect to FIG. 5 in the context of a low-power state.

FIG. 7 is a block diagram illustrating the example power domains shown and described with respect to FIG. 5 during the Z9 state, in the context of memory 290, display 240, and with P1 indicated as off.

As shown in FIG. 7, the display controller remains powered and continues displaying information provided by display controller 245 from its display buffer. Since power domain P4 is off however, the display controller 245 cannot refill its display buffer from memory 290, since data fabric 205 is off (i.e., because it is within power domain P4). Accordingly, the display buffer will empty continuously during the Z9 state.

Figure 8:
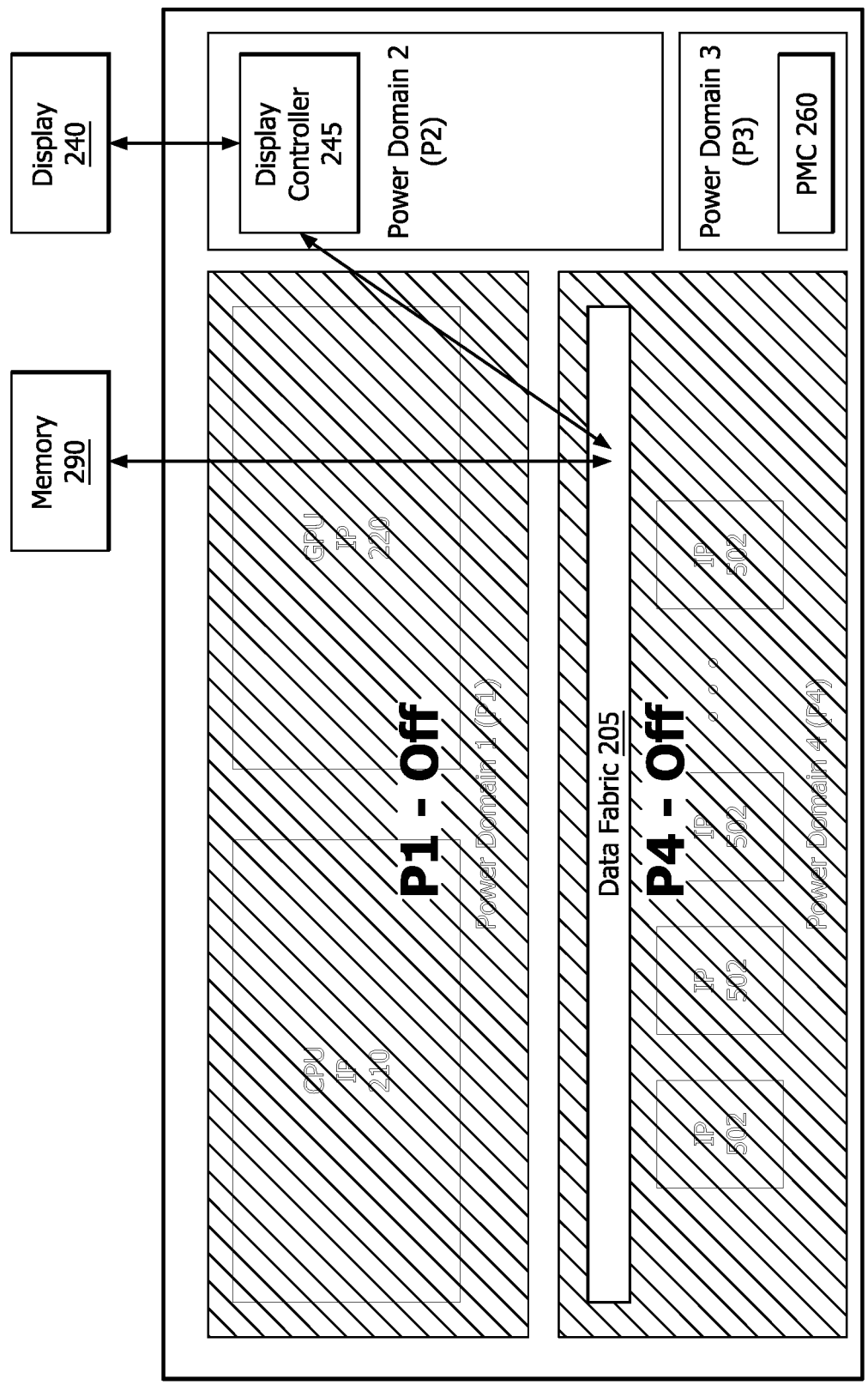
FIG. 8 is a block diagram illustrating the example power domains shown and described with respect to FIG. 5 in the context of a stutter mode.

FIG. 8 is a block diagram illustrating the example power domains shown and described with respect to FIG. 5 during the stutter mode, in the context of memory 290, display 240, and with P1 indicated as remaining off.

As shown in FIG. 7, the display controller remains powered and continues displaying information provided by display controller 245 from its display buffer. Power domain P4 remains off, however data fabric 205 (or a portion thereof) has been activated on-demand by PMD 260 due to entry into the stutter mode, providing a pathway for display controller 245 to refill its display buffer from memory 290. Accordingly, the display buffer will fill during the stutter mode.

Providing a stutter mode for on-demand activation of specific components, without exiting the current power state, can have the advantage of saving power. For example, in some implementations, activating a component within a power domain without exiting the current power state saves power by not activating other components that would be activated in a different power state. In some implementations, providing a stutter mode for activation of specific components, without exiting the current power state, can have the advantage of avoiding latency by not incurring time penalties associated with restoring and saving register state for such components. Example components include data fabric 205 and IP components 502, or portions thereof, within the P4 power domain. Examples of IP components 502 include multi-media processing units 230, I/O hub 250, memory controller 270, or I/O components 280, or portions thereof. Further example components include CPU 210 and GPU 220, or portions thereof, within the P1 power domain. It is noted that one or more stutter modes are implementable for any suitable purpose, and for any suitable power state and/or power domain.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, etc.) may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for integrated circuit power management, the method comprising:
   responsive to an entry condition of a mode of a power management state,
   entering the mode; and
   powering on a device that is otherwise powered off in the power management state responsive to entering the mode, wherein the device is powered on in the mode via a power rail that is specific to the mode;
   wherein the entry condition of the mode comprises an amount of data stored for display in a display buffer falling below a threshold amount.

2. The method of claim 1, wherein the device comprises a communications path between a second device and a third device.

3. The method of claim 1, wherein the device is in a power domain that is powered off in the power management state.

4. The method of claim 3, wherein the power domain is powered off in the mode.

5. The method of claim 1, wherein the device comprises a communications path between the display buffer and a memory.

6. The method of claim 1, wherein the device comprises at least a portion of a data fabric.

7. The method of claim 1, wherein an exit condition of the mode comprises the display buffer being full.

8. The method of claim 1, further comprising: in the mode, communicating, by the device, with a second device that is in a power domain that is on in the power management state.

9. A processor configured for power management, the processor comprising:
   circuitry configured to, responsive to an entry condition of a mode of a power management state, enter the mode; and
   circuitry configured to power on a device that is otherwise powered off in the power management state responsive to entering the mode, wherein the device is powered on in the mode via a power rail that is specific to the mode;
   wherein the entry condition of the mode comprises an amount of data stored for display in a display buffer falling below a threshold amount.

10. The processor of claim 9, wherein the device comprises a communications path between a second device and a third device.

11. The processor of claim 9, wherein the device is in a power domain that is powered off in the power management state.

12. The processor of claim 11, wherein the power domain is powered off in the mode.

13. The processor of claim 9, wherein the device comprises a communications path between the display buffer and a memory.

14. The processor of claim 9, wherein the device comprises at least a portion of a data fabric.

15. The processor of claim 9, wherein an exit condition of the mode comprises the display buffer being full.

16. The processor of claim 9, wherein the device is configured to communicate with a second device that is in a power domain that is on in the power management state, in the mode.

* * * * *